US009562586B2

(12) United States Patent
Kadowaki

(10) Patent No.: US 9,562,586 B2
(45) Date of Patent: Feb. 7, 2017

(54) VIBRATION ISOLATING BUSHING

(71) Applicant: YAMASHITA RUBBER KABUSHIKI KAISHA, Fujimino-shi, Saitama (JP)

(72) Inventor: Hirokazu Kadowaki, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/857,054

(22) Filed: Sep. 17, 2015

(65) Prior Publication Data
US 2016/0084340 A1    Mar. 24, 2016

(30) Foreign Application Priority Data

Sep. 19, 2014 (JP) .................................. 2014-192038

(51) Int. Cl.
*F16F 7/00*    (2006.01)
*F16F 13/14*   (2006.01)

(52) U.S. Cl.
CPC .................................. *F16F 13/1409* (2013.01)

(58) Field of Classification Search
CPC ......... B60G 11/12; F16C 27/063; F16F 7/108; F16F 13/16; F16F 13/1463
USPC ................ 267/140.12, 140.13, 140.2–140.5, 267/141.1–141.7, 292–294; 188/378
See application file for complete search history.

(56) References Cited

U.S. PATENT DOCUMENTS

| 1,827,233 | A | * | 10/1931 | Hughes | B60G 11/12 267/270 |
| 5,820,115 | A | * | 10/1998 | Stevenson | F16C 27/063 267/141.3 |
| 6,065,742 | A | * | 5/2000 | Whiteford | F16F 7/108 188/378 |
| 6,666,437 | B2 | * | 12/2003 | Larmande | F16F 13/1463 267/141.2 |
| 7,198,258 | B2 | * | 4/2007 | Sato | F16F 13/16 267/140.13 |

FOREIGN PATENT DOCUMENTS

JP    2004-156769    6/2004

* cited by examiner

*Primary Examiner* — Christopher Schwartz
(74) *Attorney, Agent, or Firm* — Rankin, Hill & Clark LLP

(57) ABSTRACT

To suppress a decrease in durability due to abrasion or breakage caused by a reduction of a supporting area of a stopper at the time a wrench is inputted. An inner cylinder and an outer cylinder are connected by an insulator. An inner cylinder side stopper of concave curve surface is formed on an outer circumference of an intermediate part in the longitudinal direction of the inner cylinder. On the other hand, an outer cylinder side stopper that projects toward the inner cylinder side stopper is provided on an outside of the inner cylinder side stopper. The outer cylinder side stopper is relatively moved in a recessed space of the inner cylinder side stopper so as to regulate the reduction of the supporting area.

14 Claims, 8 Drawing Sheets

REPLACEMENT SHEET

VIBRATION ISOLATING BUSHING

TECHNICAL FIELD

The present invention relates to a vibration isolating bushing for use with a suspension and the like.

BACKGROUND ART

There is publicly known a suspension bushing of the type that is used in a connecting portion between a suspension arm and a vehicle body. As this type of bushing, there is known the bushing which has an inner and outer cylinders which are arranged concentrically with each other, an elastic body which provides a connection between these cylinders, and a pair of stoppers which projects in an opposed fashion from the inner and outer cylinders (as an example, see a patent reference 1).

This example is shown in FIG. 6. FIG. 6 is a longitudinal cross sectional view of a suspension bushing taken in the axial direction of an inner cylinder, in which the suspension bushing is provided with the inner cylinder 110, an outer cylinder 120 and an insulator 130.

In a middle portion in the longitudinal direction of the inner cylinder 110, there is provided a pair of inner cylinder side stoppers 140 which has a substantially globular shaped curve and projects outwardly. In a middle portion in the longitudinal direction of the outer cylinder 120, there is provided a pair of outer cylinder side stoppers 150 which projects inwardly in opposed positions to the inner cylinder side stoppers 140. Each of surfaces of the inner cylinder side stoppers 140 and the outer cylinder side stoppers 150 is covered with an elastic body layer.

This suspension bushing is arranged in such a condition that a center axis L0 of the inner cylinder 110 extends in the vertical direction of a vehicle body (in the upward and downward direction of the drawing). The outer cylinder 120 is fixed on the vehicle body and the inner cylinder 110 is mounted on a suspension arm. This type of arrangement of the suspension bushing is referred to as "vertical insertion". In accordance with movement of the suspension, an input in the vertical direction, an input in the horizontal direction lying at right angles to the vertical direction and an input in the wrenching direction in which the center axis L0 is tilted by a suitable angle θ for example so as to become L1 are applied to the suspension bushing. These vibration inputs are absorbed by an insulator 130, and at the time of the large inputs in the horizontal direction and in the wrenching direction, the inner cylinder side stopper 140 and the outer cylinder side stopper are brought into contact with each other to regulate large displacement.

PRIOR ART REFERENCE

Patent reference 1: Japanese Patent Application Laid-open Publication No. 2004-156769.

DISCLOSURE OF THE INVENTION

Problem to be Solved by the Invention

In the prior art example of FIG. 6, in the case where the inputs in the horizontal direction and the wrenching direction are applied, first, the inner cylinder 110 is tilted from the center axis L0 to L1 due to the wrench input, and then, in this condition, the inner cylinder 110 is moved further to L2 due to the input in the horizontal direction, so that the inner cylinder side stopper 140 comes into contact with the outer cylinder side stopper 150 so as to regulate further horizontal displacement. A reference character A designates a wrench center, and an orthogonal line V0 is a line lying at right angles to the center axis L0 which passes through the wrench center A. A reference character V1 designates a line when the orthogonal line V0 is tilted at an angle of θ at the time the center line L0 is tilted at an angle of θ.

FIG. 7 is a view schematically showing conditions of the inner cylinder side stopper 140 and the outer cylinder side stopper 150 at the time the wrench is inputted, wherein (1) shows a condition at the time of a neutral position before the input of vibration, and (2) shows a condition of L1 when the center axis L0 is tilted at an angle of θ due to the wrench input.

In FIG. 7-(1), a reference character B designates an intersection point between a tip portion of the inner cylinder side stopper 140 and the orthogonal line V0, and a reference character C designates an intersection point between a tip portion of the outer cylinder side stopper 150 and the orthogonal line V0.

When the wrench is inputted, the inner cylinder is tilted at an angle of θ as shown in FIG. 7-(2), and the center axis L0 is moved to L1. At the same time, the orthogonal line V0 is moved to V1, and the inner cylinder side stopper 140 is rotated together with the inner cylinder 110 around the wrench center A, so that the intersection point B located on V1 is opposed to an intersection point D of the tip portion of the outer cylinder side stopper 150 which is located on V1.

Namely, an opposed point of the intersection point B is moved and offset from C to D. This distance between C and D is considered to be an offset amount a of the inner cylinder side stopper 140 due to the wrench input.

Next, a change of supporting areas of the outer cylinder side stopper 150 with which the inner cylinder side stopper 140 makes contact will be explained with reference to FIG. 8.

FIG. 8 is a view schematically showing the relation between the inner cylinder side stopper 140 and the outer cylinder side stopper 150, wherein (1) shows a condition at the time of a neutral position similar to FIG. 7-(1). FIG. 8-(2) shows a condition where the inner cylinder side stopper 140 is moved from L0 to L2 along the orthogonal line V0 in the direction of the outer cylinder side stopper 150 due to the input in the horizontal direction in the condition of FIG. 8-(1). In this condition, a substantially whole surface of the outer cylinder side stopper 150 is able to contact and support the inner cylinder side stopper 140, and the supporting area is large in correspondence with a width between both shoulder portions E-E of an inner end of the outer cylinder side stopper 150 in the direction of the center axis L0. A supporting area S0 in this case is indicated as a distance between both shoulder portions E-E of the inner end for convenience' sake.

FIG. 8-(3) shows a condition where the center axis L0 is tilted at an angle of θ to become L1 due to the wrench input in the condition of FIG. 8-(1) and corresponds to FIG. 7-(2). In this condition, the intersection point B is offset the amount a as mentioned above.

FIG. 8-(4) shows a condition where the inner cylinder is displaced in the direction of V1 from the condition of FIG. 8-(3) due to the input in the horizontal direction so as to be moved from L1 to L2. A portion F of the inner cylinder side stopper 140 closest to the outer cylinder side stopper 150 comes into contact with the outer cylinder side stopper 150, and the large displacement of the inner cylinder side stopper 140 is regulated by the outer cylinder side stopper 150. In this condition, F corresponds with C by chance.

In this condition, when the input in the horizontal direction is applied further to the inner cylinder, the inner cylinder side stopper 140 and the outer cylinder side stopper 150 approach while compressing the elastic body layers on each of the surfaces thereof.

However, the support by the outer cylinder side stopper 150 is terminated when the inner cylinder side stopper 140 reaches the shoulder portion E of the outer cylinder side stopper 150 located on a right end of the drawing. Namely, the supporting area S1 by the outer cylinder side stopper 150 at the time the wrench is inputted is relatively small in correspondence with a width from C to E on the right side of the drawing.

Like this, in the structure in which the inner cylinder side stopper 140 projects outwardly, the supporting area is reduced from S0 of FIGS. 8-(2) to S1 of FIG. 8-(4) (in this example, it is reduced by approximately half).

However, when the supporting area is reduced as above, a load shared by the stopper is increased, so that there is a possibility of causing abrasion or breakage to thereby deteriorate the durability.

It is therefore an object of the present invention to suppress the reduction in the supporting area of the stopper at the time the wrench is inputted and to improve the durability of the inner cylinder side stopper 140 and the outer cylinder side stopper 150.

Means for Solving the Problem

To solve the above described problems, a vibration isolating bushing according to a first feature of the present invention comprises an inner cylinder (10) and an outer cylinder (20) which are arranged concentrically with each other, an insulator (30) for connecting these inner and outer cylinders, an outer cylinder side stopper (50) arranged on an inside of the outer cylinder (20) in such a way as to project toward the inner cylinder (10), and an inner cylinder side stopper (40) arranged on an outer circumferential part of the inner cylinder (10) in a corresponding position to the outer cylinder side stopper (50) in such a way as to be recessed toward a center of the inner cylinder (10).

According to a second feature of the present invention, in addition to the first feature, the inner cylinder side stopper (40) is formed in the shape of a concave curve surface.

According to a third feature of the present invention, in addition to the first or second feature, a part of the outer cylinder side stopper (50) to be arranged face to face with the inner cylinder side stopper (40) is formed in the shape of a convex curve surface.

According to a fourth feature of the present invention, in addition to any one of the first to third features, an inner cylinder side elastic body layer (38) and an outer cylinder side stopper elastic body layer (56) are formed on surfaces of the inner cylinder side stopper (40) and the outer cylinder side stopper (50).

According to a fifth feature of the present invention, in addition to any one of the first to fourth features, an inwardly extending tip of the outer cylinder side stopper (50) enters a recessed space of the inner cylinder side stopper (40).

Effects of the Invention

According to the first feature of the present invention, since the inner cylinder side stopper which is recessed inwardly is provided in the inner cylinder, a supporting area of the outer cylinder side stopper relative to the inner cylinder side stopper at the time wrench is inputted can be increased. Therefore, the durability of the inner cylinder side stopper and the outer cylinder side stopper can be improved. In addition, since the inwardly recessed inner cylinder side stopper is provided in the inner cylinder, it is possible to reduce weight.

According to the second feature of the present invention, since the inner cylinder side stopper is formed in the shape of a concave curve surface, a change in distance with respect to the outer cylinder side stopper can be decreased at the time the wrench is inputted. Therefore, since a change of contact area is decreased, uneven abrasion due to local contact can be reduced whereby to be able to improve the durability.

According to the third feature of the present invention, since a part of the outer cylinder side stopper to be arranged face to face with the inner cylinder side stopper is formed in the shape of a convex curve surface, a change in the distance between the surface of the inner cylinder side stopper and the surface of the outer cylinder side stopper can be decreased at the time the wrench is inputted. Therefore, since the change of contact area is decreased, the uneven abrasion due to the local contact can be reduced whereby to be able to improve the durability.

According to the fourth feature of the present invention, since the inner cylinder side elastic body layer (38) and the outer cylinder side stopper elastic body layer (56) are formed on the surfaces of the inner cylinder side stopper (40) and the outer cylinder side stopper (50), a shock at the initial stage of contact between the inner cylinder side stopper (40) and the outer cylinder side stopper (50) can be softened. Therefore, the abrasion of the stopper can be suppressed whereby to improve the durability.

According to the fifth feature of the present invention, since the inwardly extending tip of the outer cylinder side stopper enters the recessed space of the inner cylinder side stopper, the outer cylinder side stopper is allowed to approach the inner cylinder side stopper as closely as possible. Therefore, the change in distance with respect to the outer cylinder side stopper can be reduced as much as possible at the time the wrench is inputted. As a result, since the change of the contact area is decreased, the uneven abrasion due to the local contact can be reduced whereby the durability can be improved more.

BEST MODE FOR CARRYING OUT THE INVENTION

Figure 1:
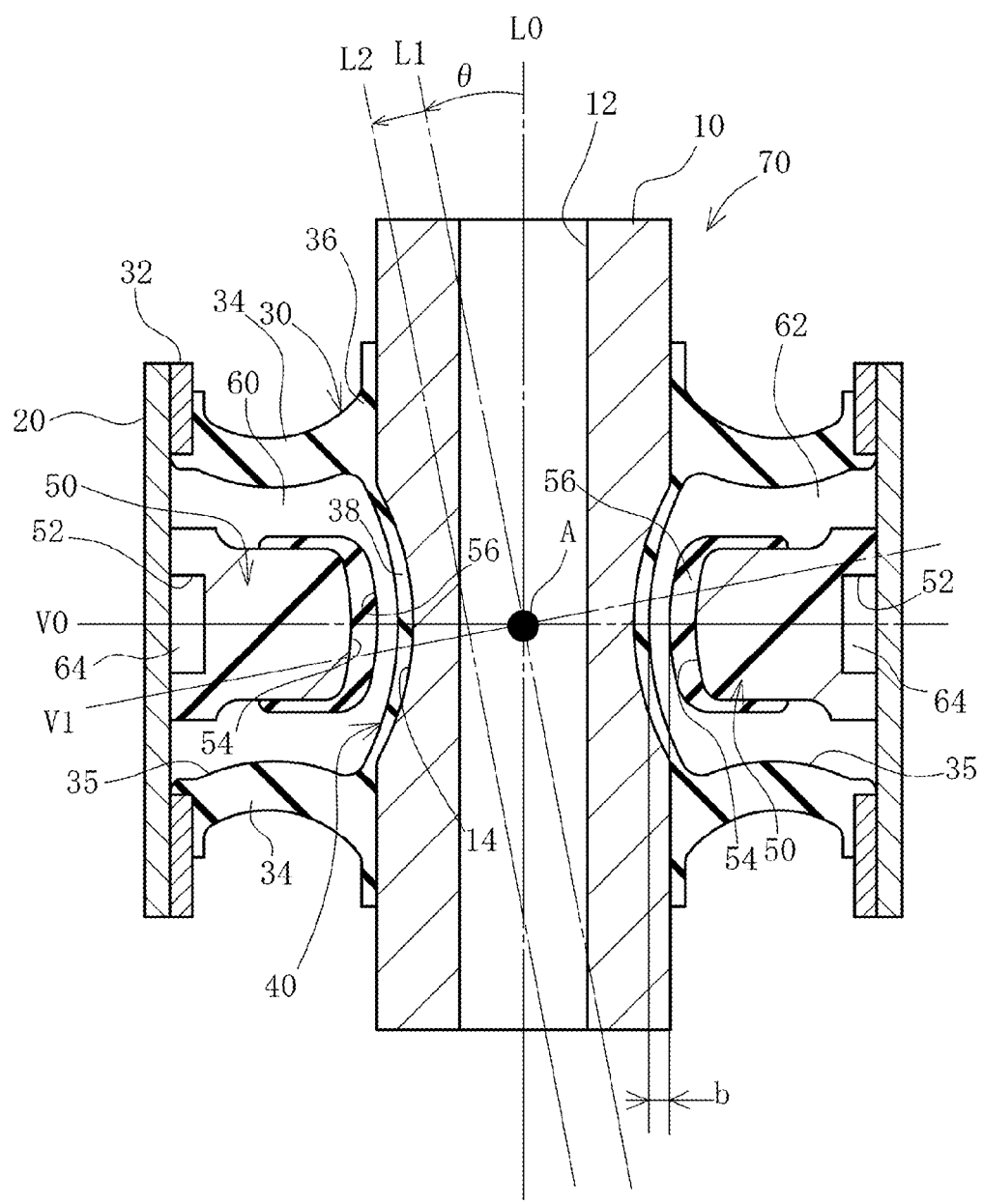
FIG. 1 is a longitudinal cross sectional view of a suspension bushing in accordance with an embodiment of the present invention.
Figure 6:
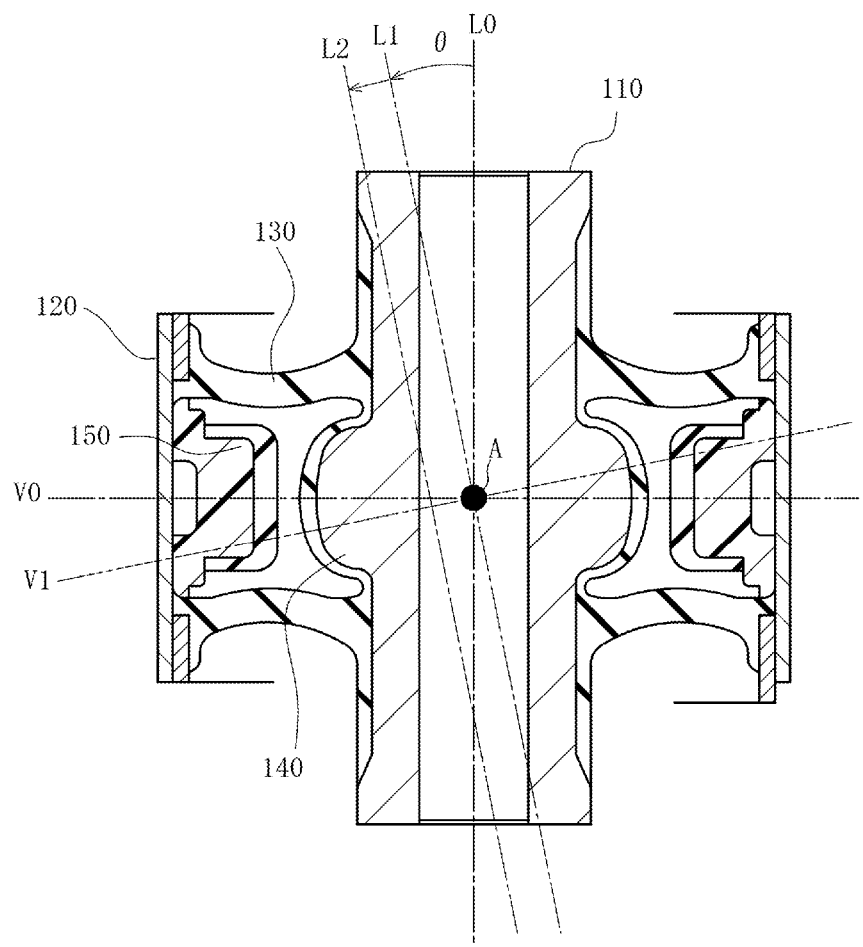
FIG. 6 is a longitudinal cross sectional view of a suspension bushing of the prior art example.

Hereinafter, an embodiment formed as a suspension bushing will be explained with reference to drawings. Since this embodiment is approximately similar to the suspension bushing of FIG. 6, reference characters A~F, L0~L2, V0, V1 and θ are commonly used, and like meanings are given like reference characters. In addition, the upward and downward direction of FIG. 1 is the upward and downward direction of the suspension bushing, and the left and right direction thereof is the horizontal direction of the suspension bushing. These directions correspond to the upward and downward direction and the left and right direction of a vehicle body on which the suspension bushing is mounted.

FIG. 1 is a longitudinal cross sectional view of the suspension bushing of a vertical insertion type. In this example, the suspension bushing is formed as a liquid sealed type of which an internal space is filled with liquid in a sealed fashion.

This suspension bushing includes an inner cylinder 10 of cylindrical shape, an outer cylinder 20 which is arranged substantially concentrically around a circumference of the inner cylinder 10, and an insulator 30 which provides a connection between the inner and outer cylinders. The inner cylinder 10 is made of metal or resin and provided with a through hole 12 in the axial direction thereof. A connecting member (not shown) is configured to pass through the through hole 12 and to be connected to a suspension arm (not shown).

In a middle part in the longitudinal direction of the inner cylinder 10, a concave portion 14 which is recessed from an outer circumferential surface thereof in the central direction is formed in such a way as to open outwardly. A surface of the concave portion 14 is formed in the shape of a curved surface of circular arc-shaped cross section. The concave portion 14 constitutes an inner cylinder side stopper 40 along with a inner cylinder side stopper elastic body layer 38 (to be referred to later) which covers the surface of the concave portion 14. The concave portion 14 is an annular recess which is formed continuously around a whole outer circumference of the inner cylinder 10. The inner cylinder side stopper 40 also is formed annually and continuously around the whole outer circumference of the inner cylinder 10. However, the concave portion 14 is not necessarily formed annually but may be formed partially in the circumferential direction in correspondence with an outer cylinder side stopper to be referred to later.

The outer cylinder 20 is made of metal and has a larger cylindrical body than the inner cylinder 10. A shape in a transverse cross section (cross section taken in the direction of an orthogonal line V0) of the outer cylinder 20 is not limited to a circular shape but includes a non-circular shape such as an ellipse, a polygon and the like.

An intermediate assembly 70 is fitted on an inner circumferential surface of the outer cylinder 20. The intermediate assembly 70 is formed such that the inner cylinder 10 and an intermediate ring 32 located around an outer circumferential region are united in a single body by the insulator 30 at the time of molding of the insulator 30 (see FIG. 1).

The insulator 30 is connected to both ends in the axial direction of the outer cylinder 20 through the intermediate ring 32.

Figure 5:
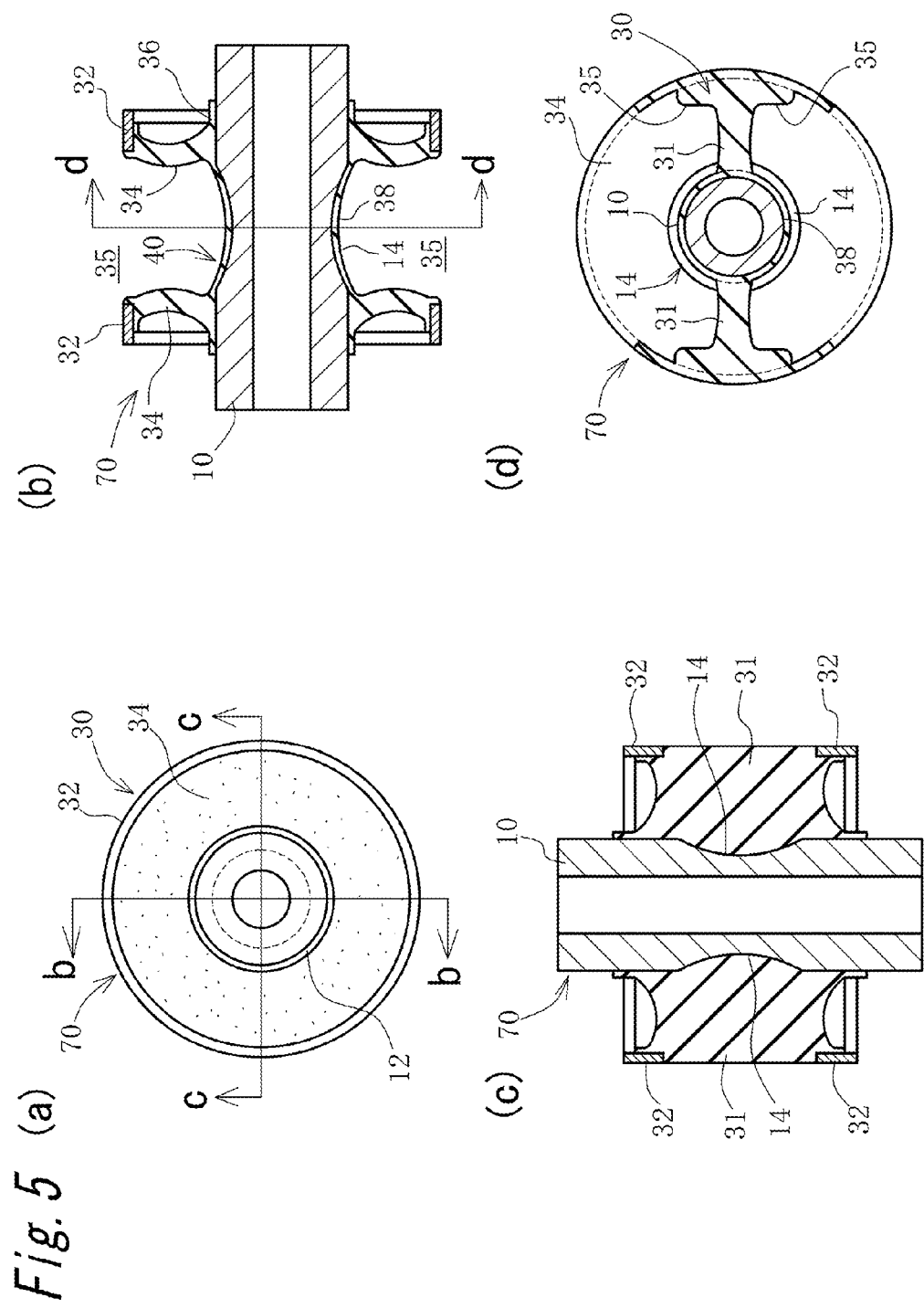
FIG. 5 is a view of an intermediate assembly in accordance with the embodiment.

FIG. 5 shows the intermediate assembly 70, wherein (a) is a side view as seen from the axial direction, (b) is a cross sectional view taken on line b-b of (a), (c) is a cross sectional view take on line c-c of (a), and (d) is a cross sectional view take on line d-d of (b).

In this drawing, the insulator 30 is made of a proper elastic material such as rubber and the like having a vibration isolating effect and formed integral with the intermediate ring 32 and the inner cylinder 10 in such a manner that it is integrated with the intermediate ring 32 and the inner cylinder 10 into a single body by vulcanization adhesion and the like so as to form the intermediate assembly 70. The intermediate ring 32 is a ring-shaped member made of metal and the like which is provided in pairs only on both end portions in the axial direction of the intermediate assembly 70.

An intermediate part in the axial direction of the insulator 30 is formed with a pocket portion 35 in the shape of a recess which opens outwardly. The pocket portion 35 is covered with the outer cylinder 20 and filled with liquid so as to form a left and right liquid chambers 60, 62 (see FIG. 1). The liquid chambers 60, 62 are partitioned on left and right sides of the inner cylinder 10 by a partition wall 31 which is integrally formed with the insulator 30. The partition wall 31, as shown also in FIG. 5-(d), extends along the inner cylinder 10 over an approximately full length of the insulator 30. As shown also in FIG. 5-(d), the partition wall 31 extends from the inner cylinder 10 outwardly in the radial direction and is formed as a wall portion which reaches the position in which it makes a close contact with the inner circumferential surface of the outer cylinder 20. The partition walls 31 are located at 180° intervals in the circumferential direction. The pocket portions 35 which form the liquid chambers 60, 62 are partitioned upward and downward by this partition wall 31.

Both ends in the axial direction of the insulator 30 constitute end walls 34, 34 of circular shape which form left and right walls of the pocket portion 35 in FIG. 5-(b). An inner circumferential part of the insulator 30 constitutes a cover member 36 which covers an outer circumferential part of the inner cylinder 10. A portion of the inner circumferential part of the insulator 30 constitutes the inner cylinder side stopper elastic body layer 38 which is formed integrally and continuously with the cover member 36 so as to cover a surface of the inner cylinder side stopper 40. The inner cylinder side stopper elastic body layer 38 is formed in the shape of a concave curve surface which has a substantially constant thickness and extends along the inner cylinder side stopper 40. A surface of the inner cylinder side stopper elastic body layer 38 forms the surface of the inner cylinder side stopper 40 in a condition where the inner cylinder side stopper 40 is not in contact with an outer cylinder side stopper 50.

When the intermediate assembly 70 is fitted in and united to an inside of the outer cylinder 20, the suspension bushing as shown in FIG. 1 is completed.

Referring to FIG. 1, the outer cylinder side stopper 50 is arranged in each of the liquid chambers 60, 62 and extends from the outer cylinder 20 into a recessed space of the inner cylinder side stopper 40.

A predetermined space b is provided between the inner cylinder side stopper 40 and an inner circumference side surface of the outer cylinder side stopper 50 formed in the shape of a convex curve surface toward the inner cylinder side stopper 40. The outer cylinder side stopper 50 is a member which surrounds substantially annularly a circumference of the predetermined space b while keeping the predetermined space b between the inner circumferential side surface thereof and the inner cylinder side stopper 10. The predetermined space b is set in accordance with a displacement amount in the horizontal direction to be regulated with respect to the inner cylinder 10.

The outer cylinder side stopper 50 is made of a proper rigid member such as resin or the like and is formed in the shape of a substantially semicircular arc when viewed in the axial direction of the inner cylinder 10. The outer cylinder side stoppers 50 are provided in pairs and each arranged in the liquid chamber 60 and the liquid chamber 62. Each end in the longitudinal direction of the outer cylinder side stoppers 50 is in contact with a partition wall of the liquid chamber.

An outer circumferential side of the outer cylinder side stopper 50 adheres tightly to and is fixed on the inner circumferential surface of the outer cylinder 20. An orifice passage 64 is formed between an outer circumferential part of the outer cylinder side stopper 50 and the inner circumferential surface of the outer cylinder 20. The orifice passage 64 is formed between the outer cylinder 20 and an outwardly open circular arc-shaped groove 52 which is formed on an outer circumferential surface of the outer cylinder side stopper 50, so as to provide communication between the liquid chamber 60 and the liquid chamber 62.

An inner circumferential surface 54 of the outer cylinder side stopper 50 is formed in the shape of a convex curve surface which extends in substantially parallel with the surface of the inner cylinder side stopper elastic body layer 38, and an outer surface of the inner circumferential surface 54 of the outer cylinder side stopper 50 is covered with an outer cylinder side stopper elastic body layer 56. The outer cylinder side elastic body layer 56 is made of an elastic material similar to or different from the insulator 30 and has a surface in the shape of a convex curve surface which extends in substantially parallel with the surface of the inner cylinder side stopper elastic body layer 38. Moreover, the outer cylinder side stopper elastic body layer 58 is configured to cover integrally a region reaching end surfaces in the axial direction of the outer cylinder side stopper 50. The surface of the outer cylinder side stopper elastic body layer 56 constitutes the surface of the outer cylinder side stopper 50 in a condition where it does not contact the inner cylinder side stopper 40.

Like this, since the inner cylinder side stopper elastic body layer 38 and the outer cylinder side stopper elastic body layer 56 are formed on the surfaces of the inner cylinder side stopper 40 and the outer cylinder side stopper 50, a shock at the initial stage of contact between the inner cylinder side stopper 40 and the outer cylinder side stopper 50 is able to be softened.

The outer cylinder side stopper 50 is arranged in such a manner that the convex curve surface part overlaps with the concave curve surface of the inner cylinder side stopper 40 in the direction of the orthogonal line V0. A most inwardly (the direction of the wrench center A) projecting portion of the convex curve surface of the outer cylinder side stopper 50 and a most inwardly recessed portion of the concave curve surface of the inner cylinder side stopper 40 are located on the orthogonal line V0 respectively. Moreover, in a cross section as shown in the drawing, a width in the axial direction of the concave curve surface of the inner cylinder side stopper 40 is formed larger than a width in the axial direction of the convex curve surface part of the outer cylinder side stopper 50, so that when the inner cylinder 10 is rotated around the wrench center A, the convex curve surface part of the outer cylinder side stopper 50 is kept in face to face relationship with the concave curve surface of the inner cylinder side stopper 40 so as not to slip out of the inner cylinder side stopper 40 in the axial direction.

In this suspension bushing, at the time of input in the vertical direction, the inner cylinder 10 moves upward and downward with respect to the outer cylinder 20, so that the upward and downward movement is absorbed by an elastic deformation of the insulator 30.

Further, the input in the horizontal direction is absorbed in such a manner that the insulator 30 is elastically deformed and the liquid moves between the liquid chamber 60 and the liquid chamber 62 through the orifice passage 64.

In addition, in the case where the inner cylinder 10 approaches the outer cylinder side stopper 50 due to a large input, the outer cylinder side stopper 50 comes into contact with the inner cylinder side stopper 40, so that the excessive displacement in the horizontal direction of the inner cylinder 10 is regulated.

Further, the wrench input is absorbed in such a manner that the inner cylinder 10 is tilted at an angle of θ so as to be moved from the center axis L0 to L1 and the insulator 30 is elastically deformed.

Moreover, at the time the input in the horizontal direction is applied in the above condition, the inner cylinder 10 is moved from L1 to L2 along the direction of V1. At the same time, the insulator 30 is elastically deformed further and the liquid moves between the liquid chamber 60 and the liquid chamber 62. Thus, the input in the horizontal direction in the above condition is absorbed. In addition, in the case of the large input, the outer cylinder side stopper 50 comes into contact with the inner cylinder side stopper 40, so that the displacement of the inner cylinder 10 is regulated.

Next, the wrench input and the movement of the inner cylinder side stopper 40 and the outer cylinder side stopper 50 will be explained.

Figure 2:
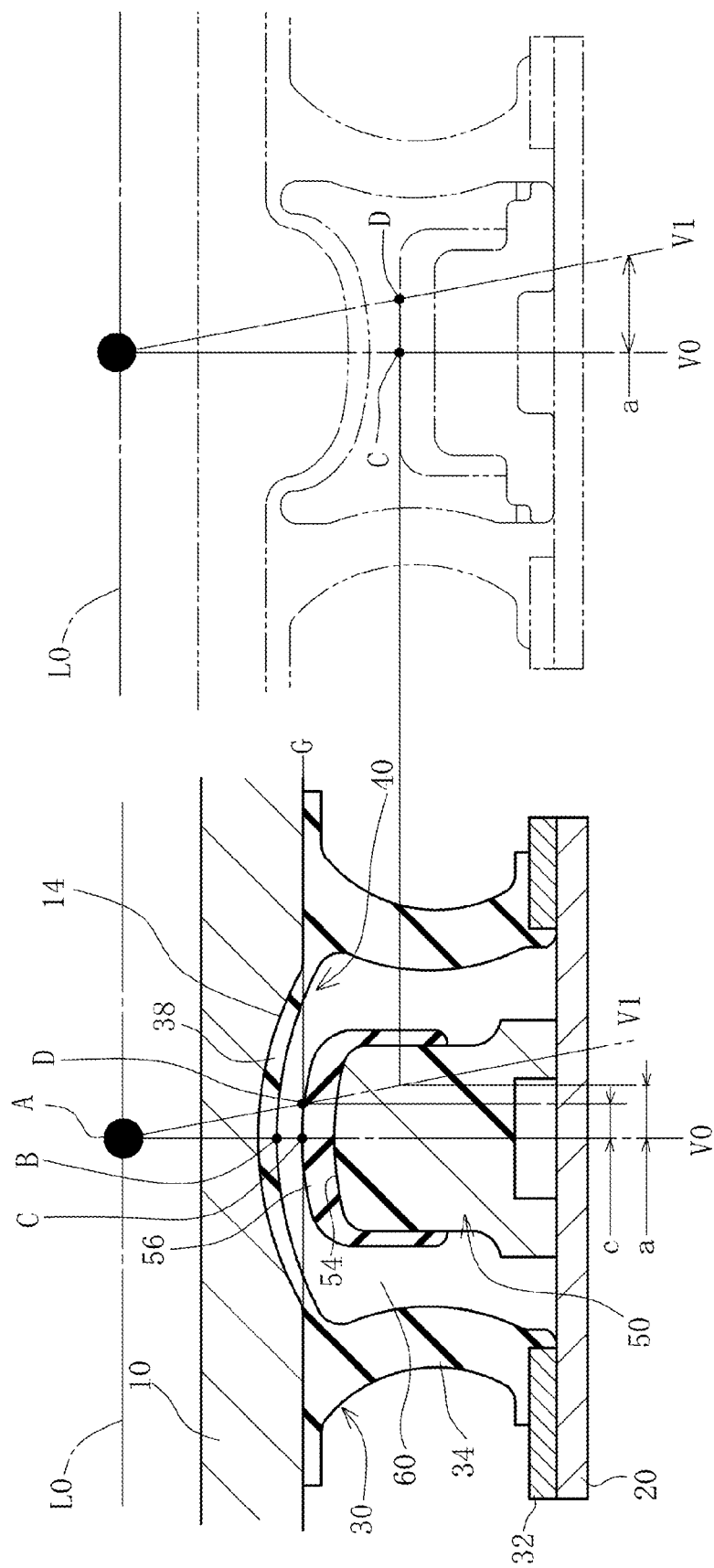
FIG. 2 is a view schematically showing a condition in a neutral position of the bushing in accordance with the embodiment while being compared with a prior art example.
Figure 7:
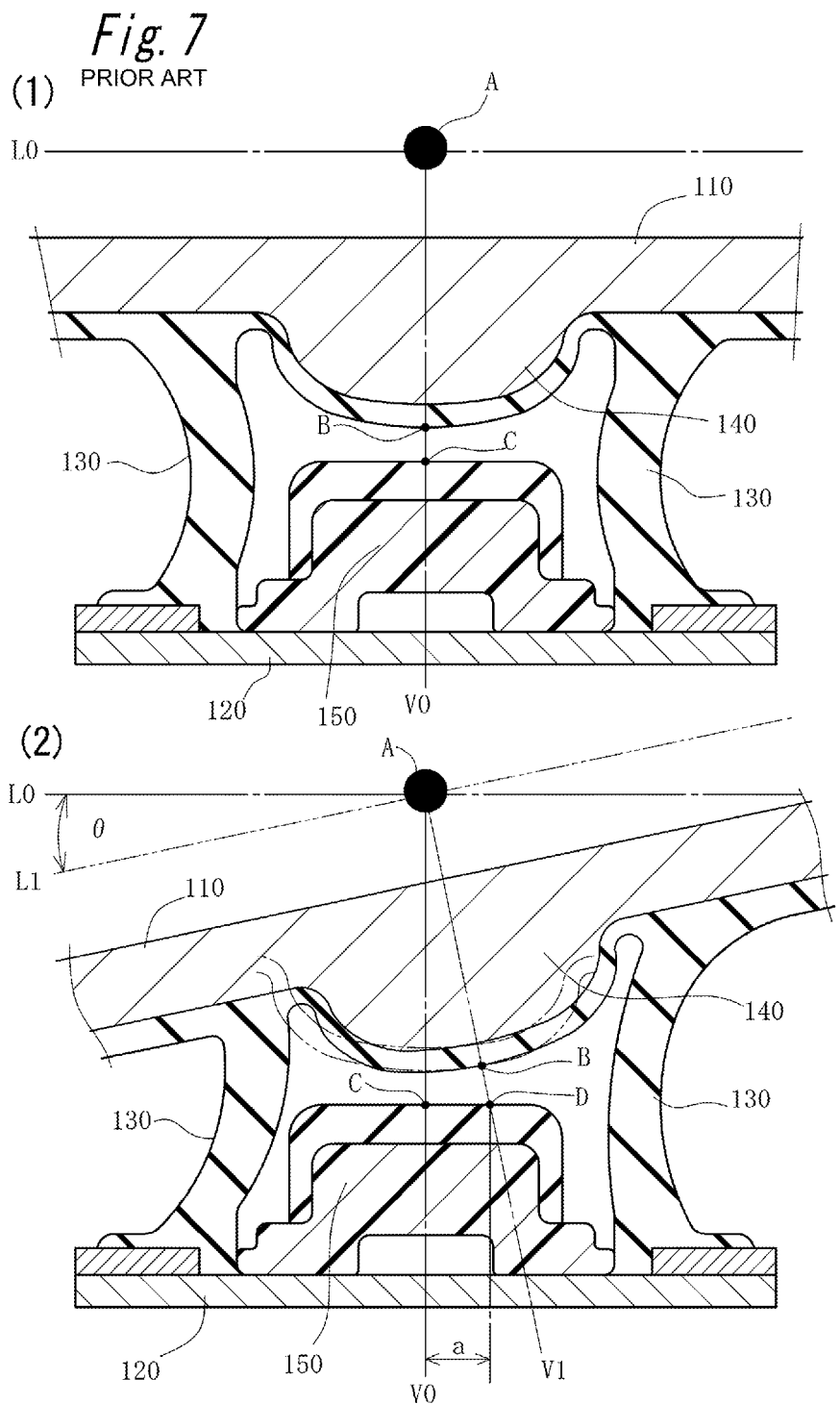
FIG. 7 is a view schematically showing conditions of the bushing of the prior art example in the neutral position and at the time the wrench is inputted.

FIG. 2 shows the inner cylinder side stopper 40 and the outer cylinder side stopper 50 in the neutral condition, namely, in the condition before the wrench input and the input in the horizontal direction, wherein the prior art example in FIG. 7 is shown by the phantom line for the sake of comparison. In this condition, the tip of the outer cylinder side stopper 50 is located in substantially the same plane with an outer circumferential line G in the region excluding the inner cylinder side stopper 40. In addition, the intersection points B and C on the orthogonal line V0 come close to each other, and C is located on G.

The tip of the outer cylinder side stopper 50 is configured to enter the recessed space of the inner cylinder side stopper 40 which is located on this outer circumferential line G or on the side closer to the wrench center A.

When the inner cylinder 10 has approached the outer cylinder side stopper 50 due to the wrench, the orthogonal line V0 is moved to V1, and the point on the V1, of the outer cylinder side stopper elastic body layer 56 opposed to the intersection point B is moved to D, so that the offset amount a from C to D becomes c. This offset amount is remarkably decreased as compared with the offset amount a of the prior art example shown in FIG. 7.

Figure 3:
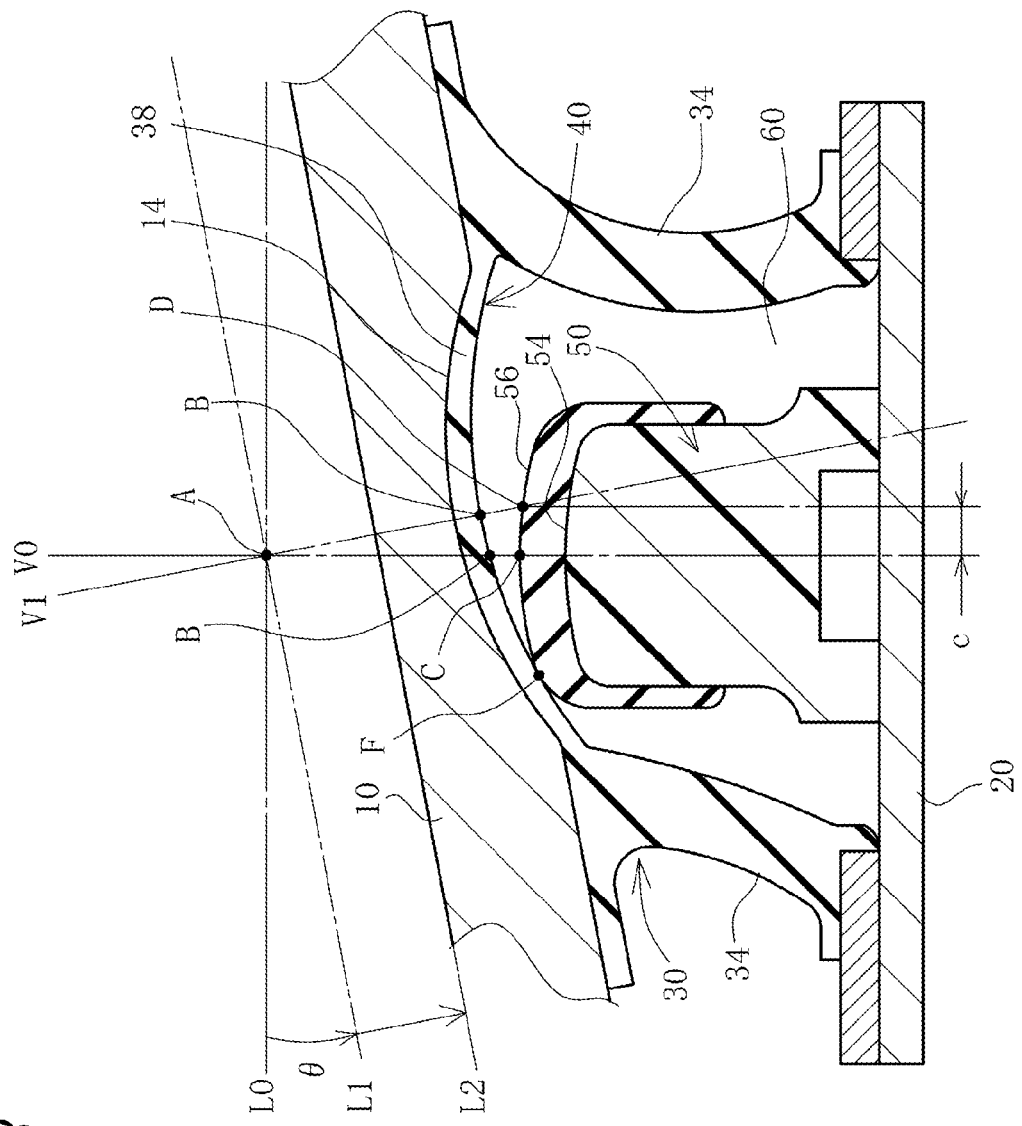
FIG. 3 is a view schematically showing a condition of the bushing in accordance with the embodiment, at the time wrench is inputted.

FIG. 3 shows the condition at the time of the wrench input. First, when the inner cylinder 10 is wrenched at an angle of θ, the center axis L0 is tilted at an angle of θ around the wrench center A so as to become L1. Then, the orthogonal line V0 becomes V1, so that the intersection point B on the orthogonal line V0 is moved to a position on V1 and C is moved to D on V1. The offset amount at that time is c.

Next, when the inner cylinder 10 is displaced along V1 due to the input in the horizontal direction so as to be moved from L1 to L2, a portion of the inner cylinder side stopper elastic body layer 38 comes into contact with a portion of the outer cylinder side stopper elastic body layer 56 at a point F. This condition is shown in the drawing.

The displacement regulation of the inner cylinder 10 by the outer cylinder side stopper 50 starts from this stage. When the displacement is increased further, the inner cylinder side stopper 40 approaches the outer cylinder side stopper 50 while elastically deforming and squeezing the inner cylinder side stopper elastic body layer 38 and the outer cylinder side stopper elastic body layer 56. When they are squeezed to the limits after all, the displacement of the inner cylinder 10 is stopped.

Figure 4:
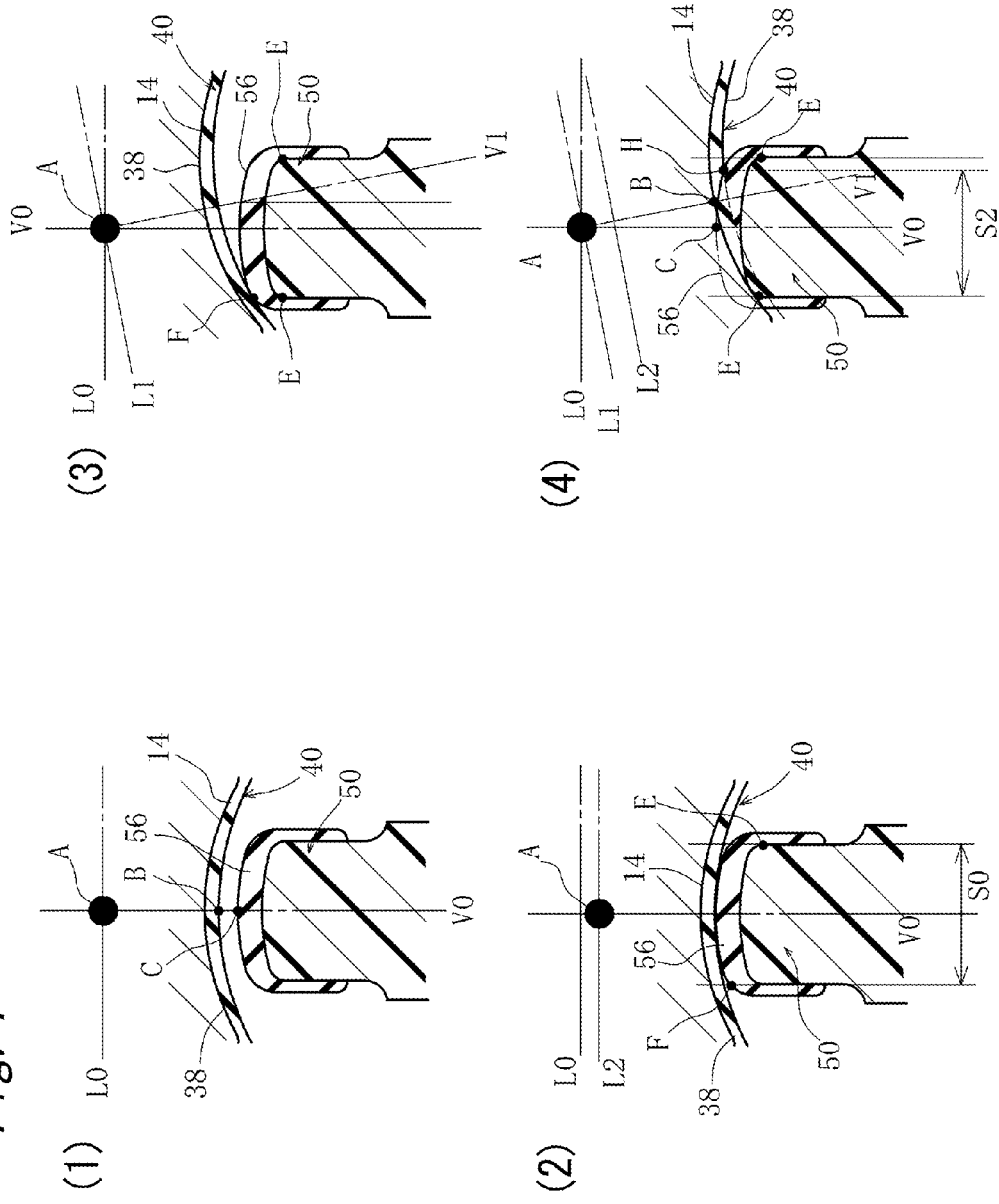
FIG. 4 is a view schematically showing a relationship between inner and outer stoppers in accordance with the embodiment.
Figure 8:
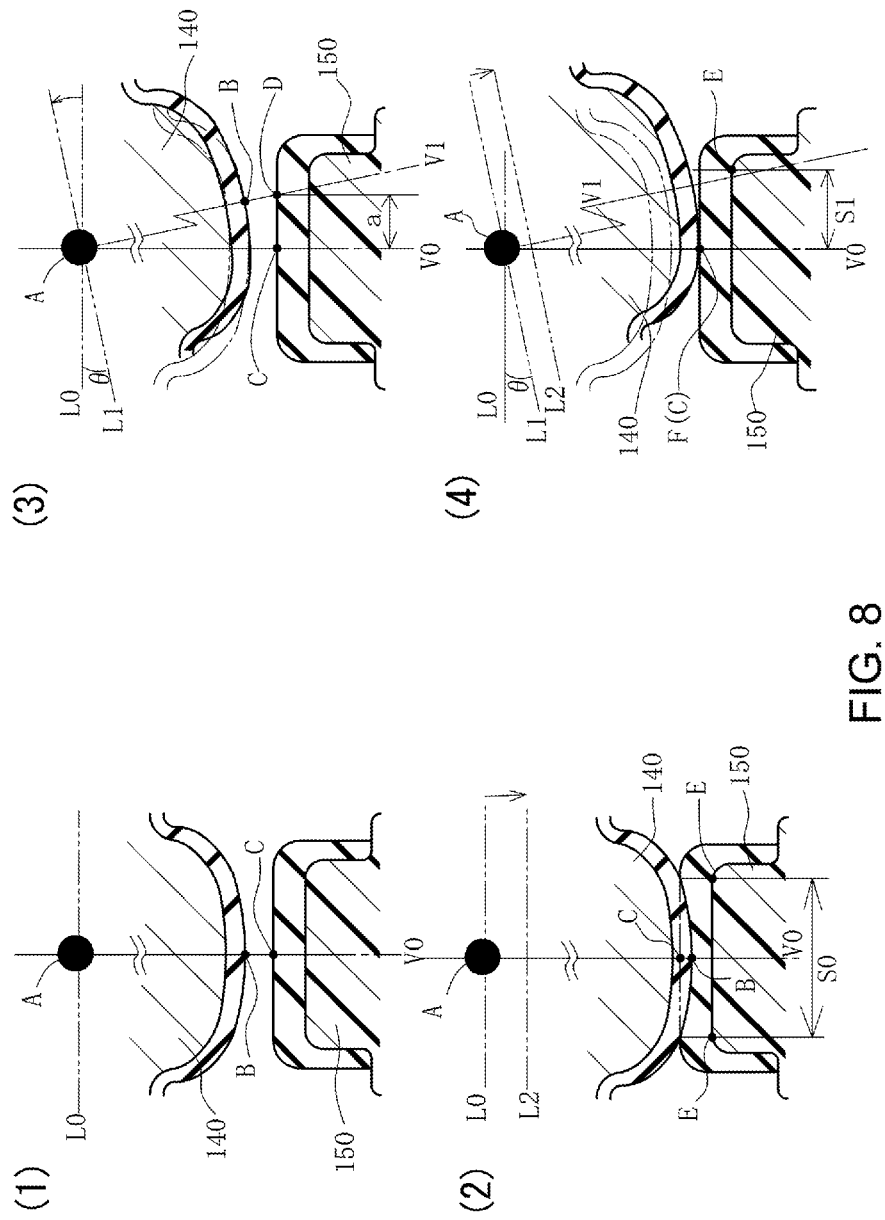
FIG. 8 is a view schematically showing a relationship between inner and outer stoppers of the prior art example.

Next, the operation of this embodiment will be explained with reference to FIG. 4. FIGS. 4(1) to (4) are diagrams similar to FIG. 8, of assistance in explaining the operation of the inner cylinder side stopper 40 and the outer cylinder side stopper 50.

FIG. 4-(1) shows a neutral position, and the intersection points B, C are located on the orthogonal line V0.

When the input in the horizontal direction is applied in this condition, as shown in FIG. 4-(2), the inner cylinder 10 is displaced along the orthogonal line V0, so that approximately the whole of the outer cylinder side stopper 50 enters approximately the whole of the inner cylinder side stopper 40. As a result, the intersection point B comes into contact with the intersection point C, and the whole of the outer cylinder side stopper 50 also contacts the inner cylinder side stopper 40. The supporting area at that time is a large area S0 which corresponds to a distance between both shoulder portions E-E.

FIG. 4-(3) shows a condition where the wrench has been inputted in the condition of FIG. 4-(1). When the inner cylinder 10 is tilted by the wrench, the center axis L0 is tilted at the angle of θ around the wrench center A so as to become L1, the orthogonal line V0 becomes V1.

At that time, a portion of the inner cylinder side topper elastic body layer 38 comes into contact with a portion F of the outer cylinder side stopper elastic body layer 56. F is located approximately on an extension line of E.

FIG. 4-(4) is a condition where the input in the horizontal direction is applied further in the condition of FIG. 4-(3). The inner cylinder 10 is displaced outwardly along V1 while squeezing by the elastic deformation the inner cylinder side stopper elastic body layer 38 and the outer cylinder side stopper elastic body layer 56. When the inner cylinder side stopper elastic body layer 38 and the outer cylinder side stopper elastic body layer 56 are squeezed to the limits after all, a portion of the outer cylinder side stopper 50 comes into contact with the inner cylinder side stopper 40, so that the further displacement of the inner cylinder 10 is stopped.

This condition is shown in a condition where the surface of the inner cylinder side stopper 40 contacts the surface of the outer cylinder side stopper 50 for convenience' sake.

At that time, the inner cylinder side stopper 40 is located on E on the left side, and, in the vicinity of E on the right side, the inner cylinder side stopper elastic body layer 38 comes into contact with the outer cylinder side stopper elastic body layer 56 at a position of H. Accordingly, the supporting area is a relatively large area S2 which corresponds to a distance between E on the left side and H. Since this S2 is substantially as large as S0, it is possible to ensure the large supporting area at the time of the wrench input and the input in the horizontal direction.

Therefore, even if the wrench input and the input in the horizontal direction are applied, the abrasion or breakage of the inner cylinder side stopper 40 and the outer cylinder side stopper 50 can be suppressed whereby to be able to improve the durability.

By the way, although the above explanation is made in relation to the condition where the input in the horizontal direction is applied after the wrench input, it is similarly applicable to the case where the inner cylinder 10 is tilted larger than 8 due to a larger wrench input.

Further, since the inner cylinder side stopper 40 is formed in the shape of a concave curve surface, a change in distance with respect to the outer cylinder side stopper 50 can be decreased at the time the wrench is inputted. Therefore, the contact area can be increased, and the durability of the inner cylinder side stopper 40 and the outer cylinder side stopper 50 can be improved. In addition, since the inner cylinder side stopper 40 in the form of a recess is provided in the inner cylinder 10, it is possible to reduce the weight.

Moreover, since a part of the outer cylinder side stopper 50 to be arranged face to face with the inner cylinder side stopper 40 is formed in the shape of a convex curve surface, a change in the distance between the surface of the inner cylinder side stopper 40 and the surface of the outer cylinder side stopper 50 can be decreased at the time the wrench is inputted. Therefore, the uneven abrasion due to the local contact can be reduced whereby to be able to improve the durability of the inner cylinder side stopper 40 and the outer cylinder side stopper 50.

Further, since the inner cylinder side stopper 40 is formed in the shape of a concave curve surface and the part of the outer cylinder side stopper 50 to be arranged face to face with the inner cylinder side stopper 40 is formed in the shape of a convex curve surface, the change in the above referred distance can be decreased further.

In addition, since the inwardly extending tip of the outer cylinder side stopper 50 enters the recessed space of the inner cylinder side stopper 40, the outer cylinder side stopper 50 is allowed to approach the inner cylinder side stopper 40 as closely as possible. Therefore, the change in distance between the outer cylinder side stopper 50 and the inner cylinder side stopper 40 can be reduced as much as possible. As a result, since the change of the contact area is decreased as much as possible, the uneven abrasion due to the local contact can be reduced whereby the durability can be more improved.

By the way, the inner cylinder side stopper 40 is not necessarily formed in the shape of a concave curve surface but may be formed in the shape of an annular groove which has a substantially U-shaped cross section.

Further, containing the case of such substantially U-shaped cross section, the inner cylinder side stopper 40 is not limited to the annular shape but may be formed partially in the circumferential direction in accordance with the outer cylinder side stopper 50. In this case, the outer cylinder side stopper 50 also is not limited to the annular shape but may be formed partially for example at 180° intervals in the circumferential direction, and the inner cylinder side stopper 40 is provided partially in the circumferential direction in such a way as to correspond to the outer cylinder side stopper 50.

Further, the forwardest tip on the inner circumferential side of the outer cylinder side stopper 50 may be arranged to enter the inner cylinder side stopper 40 in the neutral position. The reduction of the supporting area at the time of the wrench input can be suppressed as the outer cylinder side stopper 50 enters the inner cylinder side stopper 40. In addition, when the outer cylinder side stopper 50 does not enter the inner cylinder side stopper 40, the forwardest tip on the inner circumferential side of the outer cylinder side stopper 50 is located in the vicinity of the outer circumferential line G (FIG. 2) of the inner cylinder 10.

Further, either one or both of the inner cylinder side stopper elastic body layer 38 and the outer cylinder side stopper elastic body layer 56 may be dispensed with. In addition, the bushing is not limited to a liquid sealed type but may be formed in a non-liquid sealed type which is not filled with liquid.

This bushing may be put to various uses without limiting to the suspension. In addition, the bushing of horizontal insertion type having the horizontally extending center axis L0 may be employed without limiting to the vertical insertion type.

What is claimed is:

1. A vibration isolating bushing comprising:
an inner cylinder, said inner cylinder being provided with a wrench center;
an outer cylinder arranged concentrically with the inner cylinder;
an insulator for connecting said inner and outer cylinders;
an outer cylinder side stopper arranged on an inside of the outer cylinder in such a way as to extend toward the inner cylinder; and
an inner cylinder side stopper arranged on an outer circumferential part of the inner cylinder in a corresponding position to the outer cylinder side stopper and in such a way as to be recessed toward the wrench center of the inner cylinder from an outer circumferential surface of the inner cylinder, wherein said inner cylinder side stopper is normally spaced from said outer cylinder side stopper, and is adapted to come into contact with the outer cylinder side stopper during a wrench input.

2. The vibration isolating bushing according to claim 1, wherein the inner cylinder side stopper is formed in the shape of a concave curve surface.

3. The vibration isolating bushing according to claim 2, wherein a part of the outer cylinder side stopper to be arranged face to face with the inner cylinder side stopper is formed in the shape of a convex curve surface.

4. The vibration isolating bushing according to claim 2, further comprising an inner cylinder side elastic body layer and an outer cylinder side stopper elastic body layer which are formed on surfaces of the inner cylinder side stopper and the outer cylinder side stopper.

5. The vibration isolating bushing according to claim 2, wherein an inwardly extending tip of the outer cylinder side stopper enters a recessed space of the inner cylinder side stopper.

6. The vibration isolating bushing according to claim 1, wherein a part of the outer cylinder side stopper to be arranged face to face with the inner cylinder side stopper is formed in the shape of a convex curve surface.

7. The vibration isolating bushing according to claim 6, further comprising an inner cylinder side elastic body layer and an outer cylinder side stopper elastic body layer which are formed on surfaces of the inner cylinder side stopper and the outer cylinder side stopper.

8. The vibration isolating bushing according to claim 6, wherein an inwardly extending tip of the outer cylinder side stopper enters a recessed space of the inner cylinder side stopper.

9. The vibration isolating bushing according to claim 1, further comprising an inner cylinder side elastic body layer and an outer cylinder side stopper elastic body layer which are formed on surfaces of the inner cylinder side stopper and the outer cylinder side stopper.

10. The vibration isolating bushing according to claim 9, wherein an inwardly extending tip of the outer cylinder side stopper enters a recessed space of the inner cylinder side stopper.

11. The vibration isolating bushing according to claim 1, the inner cylinder side stopper and the outer cylinder side stopper are arranged on a line extending through the wrench center and orthogonal to the center axis.

12. The vibration isolating bushing according to claim 11, the inner cylinder side stopper has a surface in the shape of a concave curve surface and the outer cylinder side stopper has a surface in the shape of a convex curve surface, and a most inwardly recessed portion in the direction of the wrench center of the concave curve surface of the inner cylinder side stopper and a most inwardly projecting portion in the direction of the wrench center of the convex curve surface of the outer cylinder side stopper are positioned respectively on the orthogonal line.

13. The vibration isolating bushing according to claim 1, wherein an inwardly extending tip of the outer cylinder side stopper enters a recessed space of the inner cylinder side stopper.

14. The vibration isolating bushing according to claim 1, a width in the axial direction of the inner cylinder side stopper is formed larger than a width in the axial direction of the outer cylinder side stopper.

* * * * *